INVENTORS
TOKUSABURO KAKIUCHI
BY HIDEAKI AKIYAMA

ATTORNEYS

Sept. 21, 1971 TOKUSABURO KAKIUCHI 3,606,977
DEVICE FOR WINDING AND REWINDING FILM IN A
CARTRIDGE TYPE PROJECTOR
Filed July 15, 1969 3 Sheets-Sheet 3

Fig. 3

INVENTORS
TOKUSABURO KAKIUCHI
BY HIDEAKI AKIYAMA

Burgess, Ryan & Hicks.
ATTORNEYS

United States Patent Office 3,606,977
Patented Sept. 21, 1971

3,606,977
DEVICE FOR WINDING AND REWINDING FILM IN A CARTRIDGE TYPE PROJECTOR
Tokusaburo Kakiuchi and Hideaki Akiyama, Tokyo, Japan, assignors to Kabushiki Kaisha Ricoh, Tokyo, Japan
Filed July 15, 1969, Ser. No. 841,798
Claims priority, application Japan, July 17, 1968, 43/50,348
Int. Cl. G03b 1/04; G11b 15/32, 23/04
U.S. Cl. 242—200
2 Claims

ABSTRACT OF THE DISCLOSURE

A cartridge type movie projector having a cartridge movable between projection and rewinding positions. Depression of a projection button energizes the film drive and upon termination a signal lever releases the cartridge to move it to rewind position. Depression of the stop button during projection disengages the projection button, deenergizes the film drive and also provides for the cartridge to move to rewind position where the projection button cannot be engaged for actuation.

BACKGROUND OF THE INVENTION

The present invention relates to the device for winding and rewinding film in a projector, and more in particular in a cartridge type projector.

Miniature type projectors such as 8 mm. movie projectors are mainly used at home or at school, and the users are generally laymen. Accordingly, the projectors must have such a simple structure that no trouble should occur. The operation thereof should be easy and incorrect operation should be avoided.

However, the structure of the conventional movie projectors, in particular, that of conventional cartridge type movie projectors is complicated, and the projecting operation and rewinding operation are separate. An operator can easily make mistakes and the conventional projectors have such drawbacks that it is impossible to stop the projection and to rewind the film partially and to carry out projection again to show the same scene. Moreover break-down and trouble of conventional projectors are easily brought about.

Thus, one of the objects of the present invention is to provide a cartridge type projector, the operation of which is easy.

Another object of the present invention is to provide a cartridge type projector having film winding or film rewinding device having no fear that the break down or troubles of the projector should be brought about even if incorrect operation occurs.

SUMMARY OF THE INVENTION

The present invention provides a movie projector which is characterized by providing winding and rewinding clutches respectively driven by the driving source of the projector. These winding and rewinding clutches can be freely disconnected from the take-up reel and rewinding reel within the cartridge. Gearing is provided to connect the winding clutch into the take-up reel by a push button operation; to the effect that the winding clutch or rewinding clutch can be automatically disconnected from the take-up reel when projection is terminated, and disconnected from the rewinding reel when winding is finished. The winding and rewinding clutches can be freely disconnected from the take-up reel of the rewinding reel by optionally stopping winding and rewinding of film.

Other objects and features of this invention will be clarified in the detailed explanations in accordance with the attached diagrams.

BRIEF DESCRIPTION OF THE DRAWINGS

FIG. 3 is a perspective view showing the state of the same cartridge type movie projector in the rewinding state when it is turned off as in FIG. 1.

DESCRIPTION OF THE PREFERRED EMBODIMENT

Figure 1:
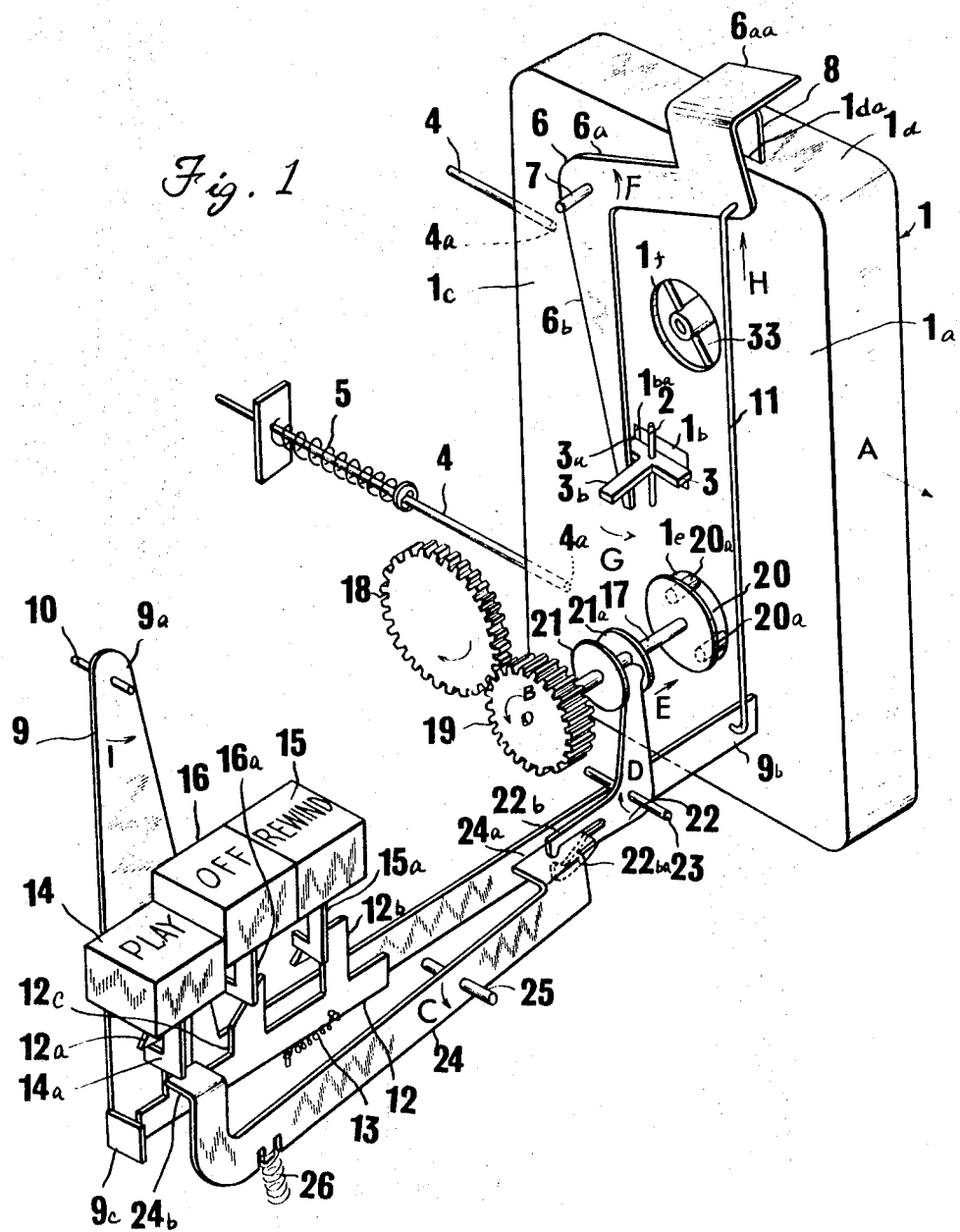
FIG. 1 is a perspective view of the main portion showing the state of a cartridge type projector when the projection is terminated and the movie projector is turned off by removing a part of a component member.
Figure 2:
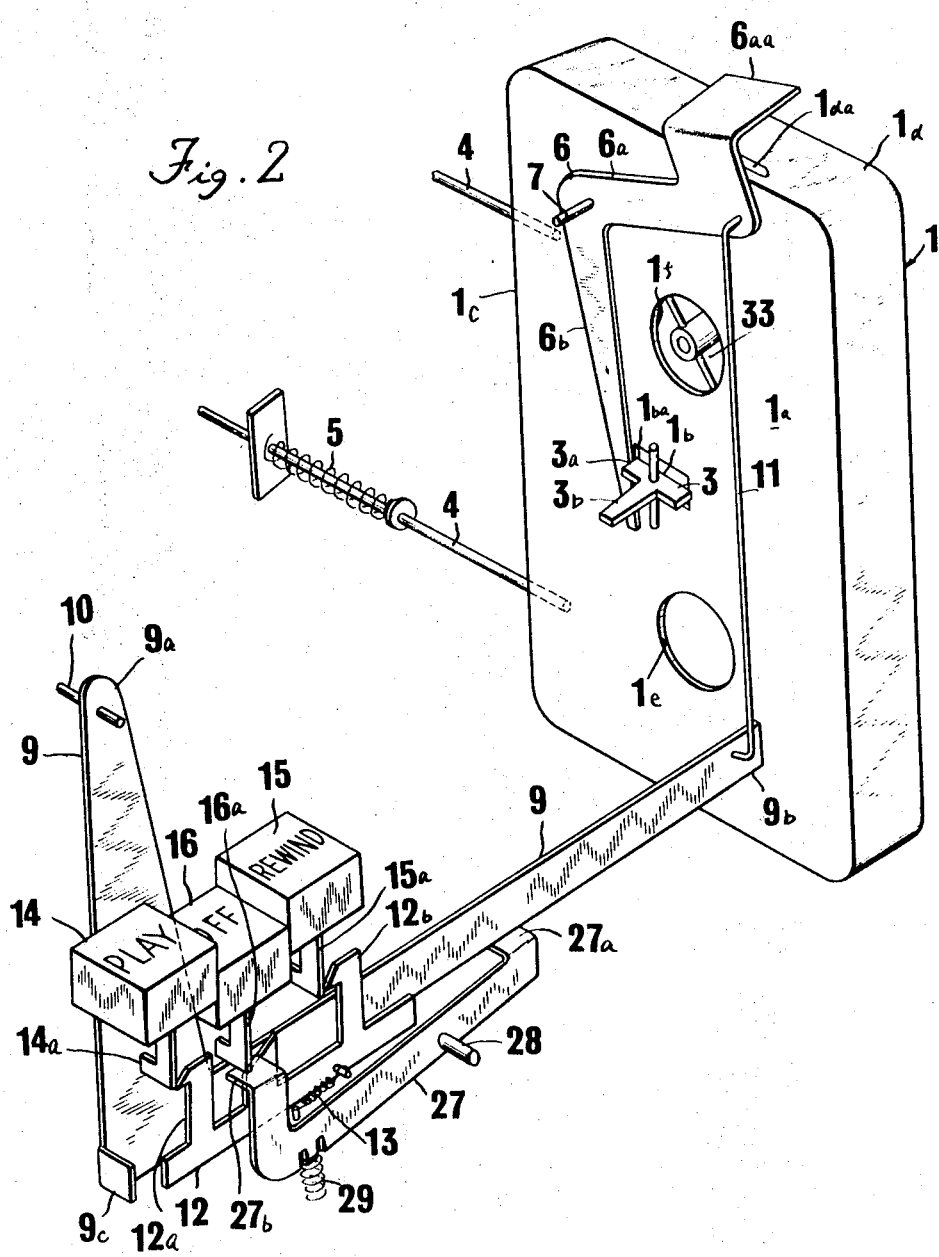
FIG. 2 is a perspective view of the cartridge type movie projector showing the state when the cartridge in projecting state is turned off as in FIG. 1.

A check rod 3 in the shape of the letter T is rotatably provided on the fixed portion of the movie projector on the side of the insertion hole, i.e., of the cartridge 1 by means of the shaft 2, and a spring (not shown) is connected thereto to provide a clockwise spring force (see FIGS. 1 and 2). Two push-rods 4 freely movable in the running direction of the cartridge as guided into the fixed portion of the projector, are provided in such a manner that they can be driven by the spring 5 in the direction of cartridge, and when the cartridge 1 enters into the insertion hole by a predetermined distance, the ends 4a of the push rods 4 abut the front end surface 1c of the cartridge 1.

When the cartridge 1 is inserted as far as the position of projection, the rod 3 is rotated clockwise, and the front end 3a thereof abuts against the front wall 1ba of an opening 1b formed on the side wall 1a of said cartridge 1 so that the cartridge 1 is restrained in the position of projection against the pushing force of the push rods 4 by means of the spring 5. When the restraint is released, the cartridge 1 is moved in the direction as is shown by an arrow A, by the pushing force of the push rod 4, and it is turned back to the rewinding position.

A two-armed first releasing rod 6 is rotatably mounted on the fixed portion by means of the shaft 7. It is so devised that when the film wound on one reel within the cartridge 1, is taken up on the other reel, the bent end portion 6aa of one arm 6a of the first releasing rod 6 can be connected to the signal rod 8 of the conventional structure for projecting outwardly from the slit 1da formed on the upper surface 1d of the cartridge. The end portion of the other end arm 6a of the first releasing rod 6 abuts the arm 3b of the check rod 3.

A second releasing rod 9 in the shape of the letter L is rotatably mounted on the fixed portion by the shaft 10, and the other end 9b and the arm 6a of the first releasing rod 6 are movably connected by means of a connecting rod 11. A moving rod 12 having hooks 12a, 12b, and 12c is movably mounted on the fixed portion in such a manner that the moving rod 12 can be approximately horizontally moved, and a spring 13 is provided between the same and the fixed portion to direct a spring force to the left as shown in FIG. 1, in such a manner that the left end of the moving rod 12 can be always abutting the bent portion 9c formed at the curve of the second releasing rod 9.

A projecting button 14, rewinding button 15, and stop button 16 are provided on the fixed portion independently in such a manner that they can be moved freely in the vertical direction, and they are spring biased upwardly so that they are always in predetermined raised positions.

When the projection button 14 (or rewinding button 15) is pushed down, the hook 14a or 15a engages with a lower surface of the hook 12a or 12b so that the projection button 14a (or rewinding button 15) is restrained at the down position as shown by hooks 12a and 14a in FIG. 1 and a driving source of the projector (not shown) is switched on. When the stop button 16 is pushed down, the hook 16a pushes against the slanting surface of the hook 12c which moves the moving rod 12 to the right side direction against the spring 13. When the restraint between the hooks 12a and 14a (or the hooks 12b and 15a) is released, the projection button 14 (or rewinding button 15) returns to its original position and the driving source is turned off to stop the operation. When either the projection button 14 or the rewinding button 15 is at the down position and the other button is pushed down, then the hook 15a or 14a pushes the slanting surface of the hook 12b or 12a which moves the moving rod 12 to the right side direction and one of the restraints is released.

A take-up shaft 17 is supported movably and rotatably on the fixed portion of the projector, and the gear 19 driven by the driving source of the projector is fixed through the gear 18 at one end of the take-up shaft 17. The width of the teeth of the gear 19 is made wide enough not to have the gearing thereof against the gear 18 disconnected by the movement of the take up shaft 17. On the other end of the take-up shaft 17, a take up ratchet plate 20 having pins 20a, 20a capable of being geared against the reel (not shown) within the cartridge 1 through the hole 1e of the side surface 1a, is fixed. A shift plate 21 having ring form groove 21a is fixed between the take up clutch plate 20 and the gear 19.

A two-armed shifter 22 is rotatably mounted on the fixed portion by means of the shaft 23. The end of one arm 22a of the take-up shifter 22 is located in a groove 21a formed by spaced apart ring plates of the shift plate 21, and forked portion 22ba is formed on the end portion of the other arm 22b.

A take-up shifter driving rod 24 is rotatably mounted on the fixed portion by means of a shaft 25, and a compressed spring 26 is provided between the rod 24 and the fixed portion to provide a clockwise spring force thereto as would appear in FIG. 1. The one end bent portion 24a of the take-up shifter driving rod 24 is supported on the forked portion 22ba while the other end bent portion 24b is abutting the lower end of the leg 14a of the projection button 14.

As shown in FIG. 2, a driving rod 27 is rotatably mounted on the fixed portion by means of a shaft 28, and a spring 29 is provided between the rod 27 and the fixed portion to provide a clockwise spring force thereto. The upper surface of the one end bent portion 27a abuts the middle lower side between the end 9b of the second releasing rod 9 and the bent portion 9c, and the other end bent portion 27b is abutting the lower end of the leg 16a of the stop button 16.

A take-up or rewinding shaft 30 as shown in FIG. 3 is rotatably and movably supported on the fixed portion of the projector, and a gear 32 driven by the driving source of the projector is fixed on one end of said rewinding shaft 30 through the gear 31. The width of the teeth of the gear 32 is made wide so that the gearing thereof against the gear 31 can not be disconnected by the movement of the rewinding shaft 30. On the other end of the rewinding shaft 30, a rewinding clutch plate 34 having pins 34a, 34a capable of being geared against a reel 33 rotatable within said cartridge through the hole 1f of the side surface 1a (see FIG. 2) when the cartridge 1 is turned back to the rewinding position, is fixed. A shift plate 35 having two ring plates with a form groove 35a formed therebetween is fixed between the rewinding clutch plate 34 and the gear 32.

A two-armed rewinding shifter 36 is rotatably mounted on the fixed portion, and the end of one arm 36b of the rewinding shifter 36 is positioned in the groove 35a of the rewinding shifter 36. Forked portion 36ba is formed at the end of the other arm 36b of the rewinding shifter 36. A rewinding shifter driving rod 37 is rotatably mounted on the fixed portion by means of a shaft 38, and a spring 39 is provided between rod 37 and the fixed portion to provide a clockwise spring force as would appear in FIG. 3. One end bent portion 37a of the rewinding shifter driving rod 37 is supported on the forked portion 36ba, and the other end bent portion 37b is abutting the lower end of the hook 15a of the rewinding button 15.

The cartridge 1 is inserted into the projector, and it is brought up to the position of projection against the pushing force of the push rod 4 where the cartridge 1 is restrained by the check rod 3. The bent portion 6aa of the first releasing rod 6 is thereupon placed slightly above the slit 1da of the upper surface 1d of the cartridge 1. The projection button 14 is pushed down in this state, the driving source of the projector is energized, and the take-up shaft 17 is rotated in the direction as is shown by the arrow B in FIG. 1. The hook 14a pushes the bent portion 24b of the take-up shifter drive rod 24 against the force of the spring 26 to rotate the rod 24 in the direction shown by the arrow C. The rod 22 is counterclockwise in the direction shown by the arrow D by the connection of the bent portion 24a and the forked portion 22ba of the take-up shifter 22. The take-up shaft 17 is moved in the direction shown by the arrow E through the take-up shift plate 21 to have the pins 20a, 20a of the clutch plate 20 geared into the reel within the cartridge to rotate the reel, and the film starts to be taken up.

When the projection button 14 is further lowered, the hook 14a is restrained by the hook 12a of the moving rod 12 and when the pushing down of the projection button 14 is released, the state in which the take-up reel is driven is retained by hook 12a engaging hook 14a and the projection is carried out.

When it is desired to stop the projection, the stop button 16 is pushed down, and the leg 16a of the stop button 16 has the moving rod 12 moved to the right to release the restraint of the hook 14a of the projection button 14. The projection button 14 thereupon returns back to the raised position to deenergize the driving source of the projector, and the second release rod 24 is rotated clockwise due to spring 26. The take-up shifter 22 is thereupon rotated counterclockwise, and the pins 20a of the clutch plate 20 are released from the reel. At the same time, the leg 16a of said button 16 pushes the bent portion 27b of the rod 27 against the force of the spring 29 to rotate the rod 27 counterclockwise, and the bent portion 27a thereof drives the second release rod 9 in a counterclockwise direction so that the first release rod 6 is rotated counterclockwise.

The end of the arm 6b of the first release rod 6 pushes the arm 3b of the check rod 3 to rotate the check rod 3 counterclockwise. Therefore the connection of the check rod 3 and the opening 1b of the cartridge, i.e., the restraint of the cartridge 1 is released at the position of projection, and the cartridge 1 is pushed by the pushing force of the push rod 4, to be moved in the direction shown by the arrow A and it is returned to the winding position. At this position, the cartridge 1 is restrained by an appropriate checking device such as spring type click stop or the like.

It is possible to remove the cartridge 1 directly from the rewinding position, and it is also possible to return to projection by pushing down the projection button 14 and pushing the cartridge 1 into the position of projection again. In addition, it is also possible to start projection by pushing down the projection button 14 and pushing the cartridge 1 to the position of projection after stopping a part or the whole of the projected film at a desirable scene by pushing down the rewinding button 15 as is explained hereinafter.

When the projection of the film within the cartridge 1 is terminated and the film is prefectly taken up on the take-up reel, the signal rod 8 of the cartridge 1 is projected outwardly from the slit 1da to be connected to the bent portion 6aa of the first release rod 6. The bent portion 6aa is pushed out, and the rod 6 is rotated in the direction shown by the arrow F, and the following series of operations are carried out. Namely, the end of the arm 6b of the first release rod 6 pushes the arm 3b of the check rod 3 to rotate the check rod 3 in the direction shown by the arrow G, and the restraint of the cartridge 1 on the position of projection is released. The cartridge 1 is moved to the rewinding position by the pushing force of the push rods 4, and at the same time the connecting rod 11 is moved in the direction shown by the arrow H by the movement of the first release rod 6, and therefore the second release rod 9 is rotated in the direction shown by the arrow I. The bent portion 9c thereof moves the moving rod 12 to the right, and the restrain of the projection button 14 is released, and it is moved back to the raised position and the energization of the driving source of the projector is disconnected. The drive rod 24 of the take-up shaft 17 is rotated clockwise, and the take-up shifter 22 is rotated counterclockwise, and the take up shaft 17 is moved to the left. The clutch pins 20a, 20a are removed from the reel, and the film rewinding preparation can be done.

In the above mentioned state, when the rewinding button 15 is pushed down in the direction shown by the arrow, the driving source of the projector is energized to rotate the gear 32 in the direction shown by the arrow Ba, and at the same time the hook 15a rotates the shifter driving rod 37 in the direction shown by the arrow J against the force of the spring 39, and the rewinding shifter 36 is rotated in the direction shown by the arrow K, and therefore the rewinding shaft 30 is rotated in the direction shown by the arrow L to gear the pins 34a, 34a of the clutch plate 34 into the rewinding reel 33 and the rewinding reel 33 is rotated to start the rewinding operation.

When the film rewinding operation is terminated, the signal rod 8 is projected from the slit 1da of the cartridge 1, to rotate the first release rod 6 in the direction shown by the arrow M, and therefore the second release rod 9 is rotated in the direction shown by the arrow I through the connecting rod II. The bent portion 9c thereof moves the moving rod 12 in the direction shown by the arrow N to release the restraint against the hook 15a, and therefore the rewinding button 15 is moved back to the raised position to disconnect the energization of the driving source of the projector. At the same time, the rewinding shifter driving rod 37 is turned clockwise, and interlockingly the rewinding shifter 36 is turned counterclockwise. The rewinding shaft 30 is moved to the left side, and the pins 34a, 34a of the clutch plate 34 are removed from the rewinding reel 33. The cartridge 1 can be removed from the projector, or inserted into the position of the projection again to carry out the show.

The safety feature when an incorrect operation is done is explained. When the projection is terminated and the cartridge 1 is moved to the rewinding position, even if the projection button 14 should be pushed down, the signal rod 8 and release rod 9 are directly operated to move the moving rod 12 in the direction shown by the arrow N, and therefore the projection button 14 is not restrained at the lowering position. Therefore the take-up reel driving member composed of the take up shaft 17 and clutch 20 can not be retained in the take-up reel driving state, and the take-up reel cannot be driven. This is the same as the case in which if the cartridge 1 at the time when the take-up is terminated, is on the position of projection, the rewinding button 15 should be erroneously pushed down, then the rewinding reel 33 cannot be driven. In particular, in this case when the position of projection and rewinding position of the cartridge 1 are opposite, as in the above given embodiment, the rewinding reel driving member cannot be connected to the rewinding reel at the position of projection, and when it is on the rewinding position, the reel driving member cannot be connected to the take-up reel, and therefore the operation is quite safe.

We claim:
1. A cartridge type movie projector wherein a film cartridge is insertable and movable between projection and rewinding positions comprising
   a cartridge having a first opening in a top surface thereof and a second opening in a side surface thereof;
   a signal means located within said cartridge and adapted to project outwardly through said first opening upon termination of projection;
   a two-armed lever means having an intermediate portion and end portions, said lever means pivotally mounted on said cartridge and having one end portion adapted to be contacted by said projecting signal means for rotation with respect to said cartridge;
   a check rod projecting out from said second opening for holding said cartridge in the projection position and adapted to be contacted by the other end portion of said lever means for movement out of said position;
   biasing means forcing said cartridge from the projection position to the rewinding position upon said movement of said check rod;
   a release rod pivotally mounted on the projector;
   a connecting rod connecting one end of said release rod to said intermediate portion of said lever means;
   a plurality of push buttons comprising a projection button and a stop button, said buttons having individual hooks on the bottom thereof and being depressible for actuation;
   a power source adapted to drive the film;
   connectible and disconnectible clutch means for connecting said power source for driving the film;
   a longitudinally moving rod positioned below said push buttons, said moving rod having an engaging hook below said projection push button hook, and said moving rod further having a slanting surface below said stop push button;
   said moving rod biased to abut the other end of said release rod;
   a shifter drive rod pivotally mounted on the projector, one end of said shifter rod adapted to be rotated by depression of said projection button whereby the other end of said drive rod is correspondingly rotated to cause engagement of said clutch means, said projection button being held in said depressed position by said engaging hook, and said power source adapted to be actuated by the depressing of said projection button;
   said stop button being depressible to engage said slanting surface causing movement of said moving rod and disengagement of said projection button, said disengagement allowing said shifter drive rod to return to its non-rotated position and thereby disconnect the power source from driving the film; and
   a driving rod pivotally mounted on the projector and having one end contacted by the depression of the stop button whereby its other end moves said release rod thereby rotating said lever means and associated check rod to allow said cartridge to be moved to rewind position.

2. A cartridge type movie projector according to claim 1 in which said release rod includes a bent end portion normally abutting said moving rod, and movement of said cartridge to rewind position allows said release rod to maintain said moving rod in disengaged position.

References Cited

UNITED STATES PATENTS 3,093,334  6/1963  Andrews _____ 242—201X

LEONARD D. CHRISTIAN, Primary Examiner

U.S. Cl. X.R.

352—72